United States Patent
Arakane et al.

(10) Patent No.: US 9,708,001 B2
(45) Date of Patent: Jul. 18, 2017

(54) AUTOMATIC STEERING SYSTEM FOR WORKING VEHICLE

(71) Applicant: TOKYO KEIKI INC., Tokyo (JP)

(72) Inventors: Hiroomi Arakane, Tokyo (JP); Takao Sagawa, Tokyo (JP); Nobuyuki Okamura, Tokyo (JP); Yasuharu Hashimoto, Tokyo (JP); Shioto Tanaka, Tokyo (JP)

(73) Assignee: TOKYO KEIKI INC., Tokyo (JP)

( * ) Notice: Subject to any disclaimer, the term of this patent is extended or adjusted under 35 U.S.C. 154(b) by 0 days.

(21) Appl. No.: 14/780,493

(22) PCT Filed: Dec. 27, 2013

(86) PCT No.: PCT/JP2013/085096
§ 371 (c)(1),
(2) Date: Sep. 25, 2015

(87) PCT Pub. No.: WO2014/155893
PCT Pub. Date: Oct. 2, 2014

(65) Prior Publication Data
US 2016/0052546 A1 Feb. 25, 2016

(30) Foreign Application Priority Data
Mar. 29, 2013 (JP) ................. 2013-074699

(51) Int. Cl.
*B62D 6/00* (2006.01)
*B62D 15/02* (2006.01)

(52) U.S. Cl.
CPC ......... *B62D 15/025* (2013.01); *B62D 15/029* (2013.01)

(58) Field of Classification Search
CPC combination set(s) only.
See application file for complete search history.

(56) References Cited

U.S. PATENT DOCUMENTS

2001/0018638 A1* 8/2001 Quincke ............. A01B 79/005
                                                                                701/468
2006/0041354 A1* 2/2006 Schick ................ A01B 69/008
                                                                                 701/41
(Continued)

FOREIGN PATENT DOCUMENTS

JP     H 03-099305 A     4/1991
JP     H 05-019853 A     1/1993
(Continued)

OTHER PUBLICATIONS

International Search Report (ISR) (PCT Form PCT/ISA/210), in PCT/JP2013/085096, dated Jan. 28, 2014.
(Continued)

*Primary Examiner* — Edward J Pipala
(74) *Attorney, Agent, or Firm* — McGinn IP Law Group, PLLC (57) ABSTRACT

An automatic steering system for a working vehicle, for automatic maneuvering of the working vehicle running on a working ground surface along a desired running path, in which the influences of various ground surface environments and of any aging degradation and/or individual variation of the working vehicle may be minimized, and the automatic steering operation may be conducted with improved stability. The automatic steering system includes a measurement section for acquiring measurements including those of the position, velocity, heading direction, and attitude of the vehicle and a data processing section. The data processing section includes a vehicle related parameter estimator for determining a value of a vehicle related parameter and a ground surface related parameter estimator for determining a value of a ground surface related parameter.

6 Claims, 6 Drawing Sheets

(56) References Cited

U.S. PATENT DOCUMENTS

| | | | |
|---|---|---|---|
| 2008/0289308 A1* | 11/2008 | Brubaker | A01D 41/1278 56/10.2 F |
| 2009/0088932 A1* | 4/2009 | Diekhans | A01D 41/127 701/50 |
| 2011/0022267 A1 | 1/2011 | Murphy | |
| 2011/0144865 A1* | 6/2011 | Niemz | B62D 5/0469 701/42 |
| 2012/0283909 A1* | 11/2012 | Dix | B60D 1/36 701/41 |
| 2013/0041549 A1 | 2/2013 | Reeve et al. | |
| 2013/0226394 A1* | 8/2013 | Amirpour | G01M 17/06 701/31.4 |

FOREIGN PATENT DOCUMENTS

| | | |
|---|---|---|
| JP | H 05-216535 A | 8/1993 |
| JP | H 07-184411 A | 7/1995 |
| JP | H 10-066405 A | 3/1998 |
| JP | 2003-022130 A | 1/2003 |
| JP | 2003-044136 A | 2/2003 |

OTHER PUBLICATIONS

Extended European Search Report dated Mar. 29, 2017, in European Patent Application No. 13879926.6.

\* cited by examiner

AUTOMATIC STEERING SYSTEM FOR WORKING VEHICLE

TECHNICAL FIELD

The present invention relates to an automatic steering system for a working vehicle, in which the position, velocity and attitude of the working vehicle running on a ground surface are detected for achieving automatic steering of the working vehicle.

BACKGROUND OF THE INVENTION

A prior art automatic steering method using such kind of an automatic steering system is known, for example, from Patent Document No. 1 listed below. With this method, automatic steering is conducted for an agricultural vehicle having automatic maneuvering functionality. The heading direction of the vehicle is detected by means of a heading direction sensor, such as a geomagnetic azimuth sensor or a gyroscope, and any deviation of the actual heading direction from a desired heading direction is determined in order to control the steering mechanism of the vehicle such that the vehicle may keep the desired heading direction.

Patent Document No. 2 listed below describes an automatic rice-planting vehicle having a direction sensor, such as a geomagnetic azimuth sensor or a gyroscope. During a training running operation, the rice-planting vehicle collects data indicating a desired heading direction. When operated to run by automatic maneuvering, the vehicle is controlled by an automatic steering system such that it may keep the desired heading direction indicated by the collected data. In addition, the desired heading direction is updated by collecting new direction data and effecting an averaging operation to them. When used for work, the rice-planting vehicle usually runs along a serpentine pattern of a running path having parallel, straight sections. The process of updating the desired heading direction improves the parallelism of the parallel, straight sections of the running path.

Patent Document No. 3 listed below describes a driverless maneuvering of a tractor. The position and heading direction of the tractor are detected in real-time manner by means of a fiber optic gyroscope and a geomagnetic azimuth sensor. The tractor is intended to run along a predetermined running path, by which desired positions and heading directions of the tractor are defined. When the tractor is steered by real-time steering control, any deviation of the actual position and heading direction of the tractor from the corresponding desired position and heading direction is continuously determined and the desired steering angle is so determined as to eliminate such deviation.

PRIOR ART DOCUMENTS

Patent Documents

Patent Document No. 1: Japanese Patent Application Publication No. Hei-7-184411 (1995-184411)
Patent Document No. 2: Japanese Patent Application Publication No. 2003-44136
Patent Document No. 3: Japanese Patent Application Publication No. Hei-10-66405 (1998-66405)

SUMMARY OF THE INVENTION

Problems to be Solved by the Invention

Working vehicles run not only on flat ground surfaces, such as those of pavements, but also on various ground surfaces, the environments of which may often have undulations, slants, water hazards, and other obstacles such as bushes and trees. Such environments may cause large variations in attitude of the working vehicle as well as induce vibrations in the body of the working vehicle, which would impose substantial influence on the quality of automatic steering of the working vehicle.

In addition, working vehicles that are intended for long-term use in various ground surface environments tend to be subject to substantial aging degradation as well as may have large individual differences, which would also impose substantial influence on the quality of automatic steering of the working vehicle.

The present invention has been achieved in view of the problems mentioned above. Accordingly, it is an object of the present invention to provide an automatic steering system for a working vehicle, in which the influences of various ground surface environments and of any aging degradation and/or individual variation of a working vehicle may be reduced, and the automatic steering operation may be conducted with improved stability.

Resolution

According to the present invention, the above object is achieved by an automatic steering system for a working vehicle, for automatic maneuvering of the working vehicle running on a working ground surface along a desired running path.

The automatic steering system comprises a measurement section for acquiring measurements including those of position, velocity, heading direction, and attitude of the vehicle. The automatic steering system further comprises a data processing section.

The data processing section comprises a vehicle related parameter estimator for determining a value of a vehicle related parameter, a ground surface related parameter estimator for determining a value of a ground surface related parameters, and a steering amount value generator for generating a desired steering amount value on the basis of the determined value of the vehicle related parameter and the determined value of the ground surface related parameter.

The automatic steering system is adapted for operation (i) in a working mode which is to be adopted when the working vehicle runs on the working ground surface and (ii) in a pre-adjustment mode which is to be adopted in advance to an operation of the automatic steering system in the working mode.

During an operation of the automatic steering system in the pre-adjustment mode, the vehicle related parameter estimator determines the value of the vehicle related parameter on the basis of the measurements acquired by the measurement section.

During an operation of the automatic steering system in the working mode, the vehicle related parameter estimator updates the value of the vehicle related parameter and the ground surface related parameter estimator determines the value of the ground surface related parameter on the basis of the measurements acquired by the measurement section.

The vehicle related parameter may comprise at least one of (i) a parameter indicating relationship between steering wheel rotation angle and turning radius of the vehicle, (ii) a parameter indicating inclination of a vehicle body of the vehicle that is attributable to a vehicle related factor, and (iii) a parameter indicating vibration components of the vehicle body that are attributable to a vehicle related factor.

The ground surface related parameter may comprise at least one of (i) a parameter indicating inclination of a vehicle body that is attributable to ground surface gradient and (ii) a parameter indicating ground surface slipperiness.

The data processing section may further comprise an alarm generator which compares a value of a ground surface related parameter with a threshold and outputs an alarm signal when the value of the ground surface related parameter exceeds the threshold.

Advantages Provided by the Invention

According to the present invention, the automatic steering system is adapted for operation (i) in a working mode which is to be adopted when the working vehicle runs on the working ground surface and (ii) in a pre-adjustment mode which is to be adopted in advance to an operation of the automatic steering system in the working mode. During the pre-adjustment mode, values of vehicle related parameters are determined. During the working mode, the values of the vehicle related parameters are updated and values of ground surface related parameters are determined. Thus, the determination of the values of the vehicle related parameters is conducted separately from the determination of the values of the ground surface related parameters, so that the values of the parameters may be determined with high precision. Any aging degradation and/or individual variation of the vehicle may be recognized on the basis of the values of the vehicle related parameters, while any influences of the ground surface imposed on the vehicle may be recognized on the basis of the values of the ground surface related parameters. The desired steering amount value used for the automatic steering may be generated with such information being taken into consideration, so that the influences of various ground surface environments as well as of any aging degradation and/or individual variation of the working vehicle may be reduced, and the automatic steering operation may be conducted with improved stability.

BRIEF DESCRIPTION OF THE DRAWINGS

FIG. 6 (*a*) and FIG. 6 (*b*) illustrate inclination of a vehicle body, gradient of a ground surface, and relationship between the position of a GPS antenna and a determined position of the vehicle.

EXEMPLARY MODE FOR CARRYING OUT THE INVENTION

Hereinafter, an embodiment of the present invention will be described with reference to the accompanying drawings.

Figure 1:
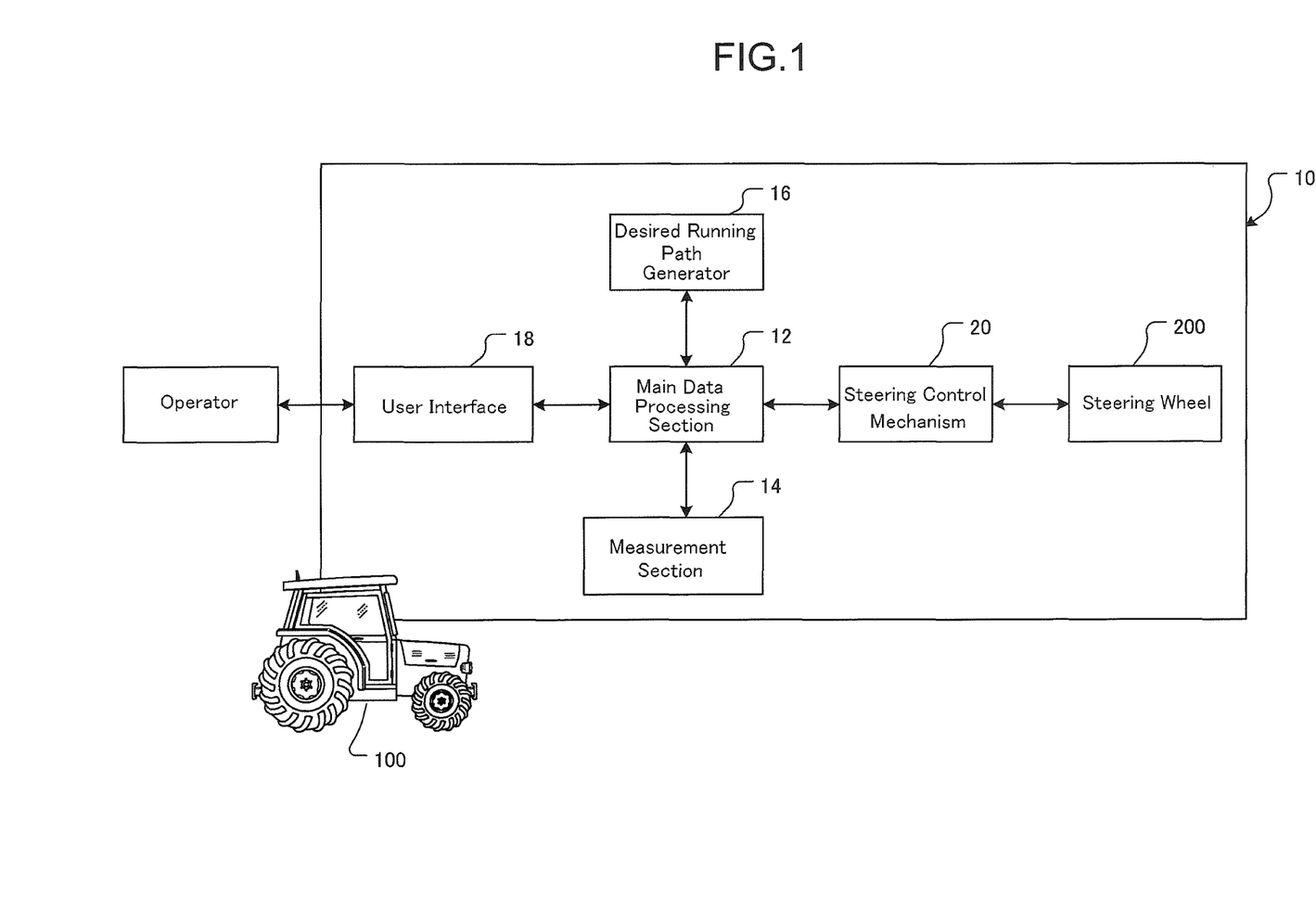
FIG. 1 is a block diagram showing of an automatic steering system in accordance with an embodiment of the present invention.

As shown in FIG. 1, an automatic steering system 10 in accordance with an embodiment of the present invention is mounted on a working vehicle 100. The working vehicle 100 may be, for example, a working tractor for agricultural purpose, civil engineering purpose, tree felling, lawn mowing, or any of other purposes, or it may be a working vehicle serving as construction equipment, or others. The working vehicle 100 runs not only on well paved roads but also on various ground surfaces in the working area (referred to as "the working ground surface" hereinafter). The working area may include, for example, farm fields, forest fields and/or unpaved roads. The working ground surface may have undulations, slants, water hazards and/or various obstacles such as trees and bushes. The automatic steering system 10 is mounted on the working vehicle 100 in order to perform automatic steering of the working vehicle 100 in an attempt to reduce burdens imposed on its operator.

In general, the automatic steering system 10 includes: a main data processing section 12 for determining values of "vehicle related parameters" and "ground surface related parameters" as well as for generating a desired steering amount value; a measurement section 14 for measuring and acquiring motion data of the vehicle, including the position, velocity and attitude of the vehicle; a desired running path generator 16 for generating a desired running path on the basis of inputted, determine, and/or estimated data, and outputting the generated desired running path; a user interface 18 for receiving inputs from and providing outputs to the operator of the vehicle; and a steering control mechanism 20 for controlling a steering wheel 200 of the vehicle on the basis of the desired steering amount value supplied from the main data processing section 12.

Figure 2:
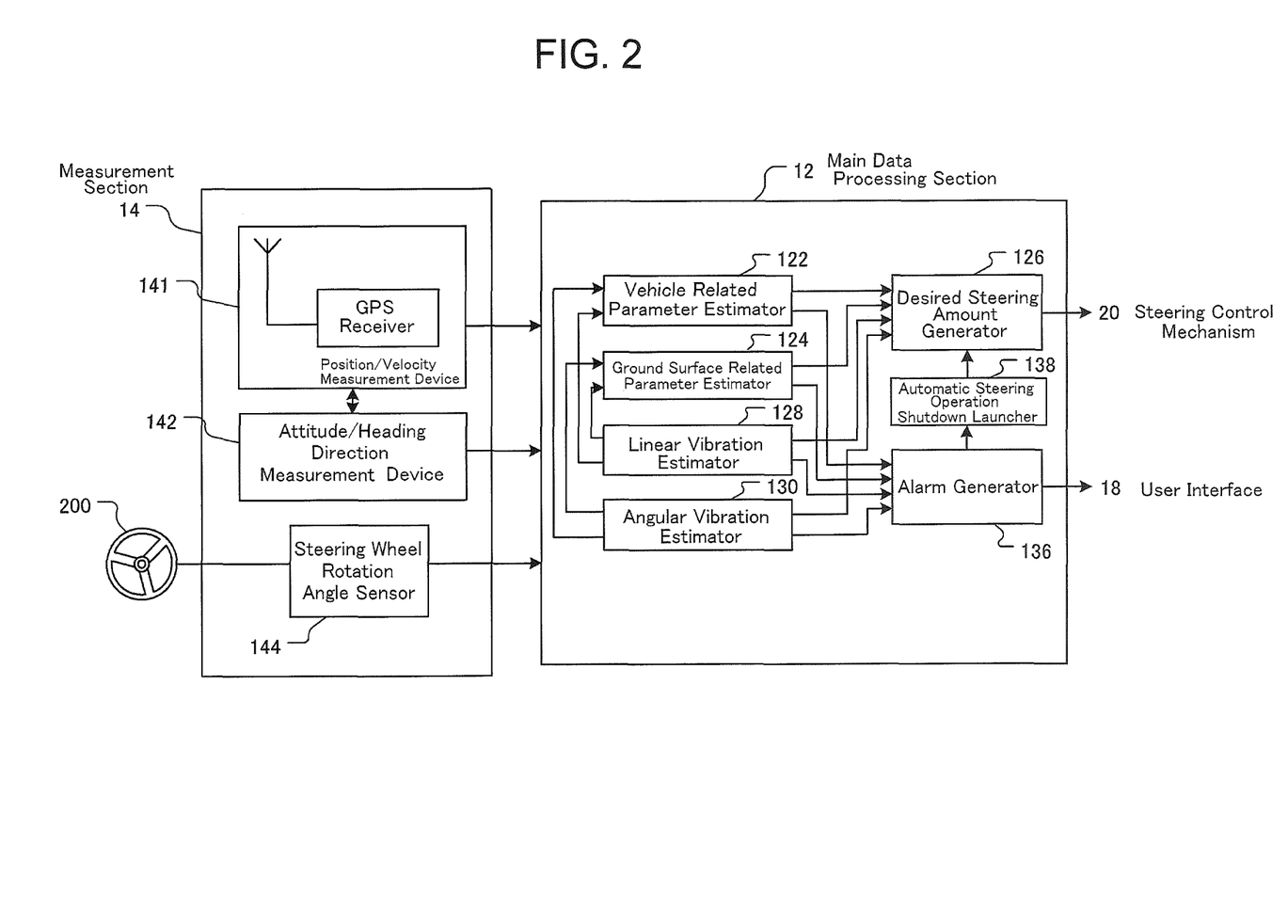
FIG. 2 is a block diagram showing a part of the automatic steering system of FIG. 1.

As shown in FIG. 2, the main data processing section 12 includes: a vehicle related parameter estimator 122 for determining values of the vehicle related parameters; a ground surface related parameter estimator 124 for determining values of the ground surface related parameters; a desired steering amount generator 126 for generating a desired steering amount value; a linear vibration estimator 128; an angular vibration estimator 130; an alarm generator 136; and an automatic steering operation shutdown launcher 138. The functionalities of these elements will be described later in detail.

The measurement section 14 includes a plurality of measurement devices, which are: a position/velocity measurement device 141 for measuring the position, velocity and heading direction of the vehicle, which includes a GPS antenna and a GPS receiver for a satellite navigation system; an attitude/heading direction measurement device 142 for measuring the acceleration, angular velocity, attitude and heading direction of the vehicle, which includes a gyroscope for detecting angular velocities of the vehicle body about x-, y- and z-axes of the coordinate system fixed to the vehicle body, an accelerometer for detecting linear accelerations of the vehicle body along the x-, y- and z-axes, and a geomagnetic azimuth sensor for detecting the magnetic azimuth angle; and a steering wheel rotation angle sensor 144 for detecting the rotation angle of a steering wheel 200, which includes a rotary encoder. The measurements measured and acquired by these measurement devices are provided to, used by, and stored in the main data processing section 12. The position/velocity measurement device 141 and the attitude/heading direction measurement device 142 may exchange their measurements with one another when necessary in order to conduct calibration of the devices and interpolation of the measurements, for improving precision of the measurements.

Figure 5:
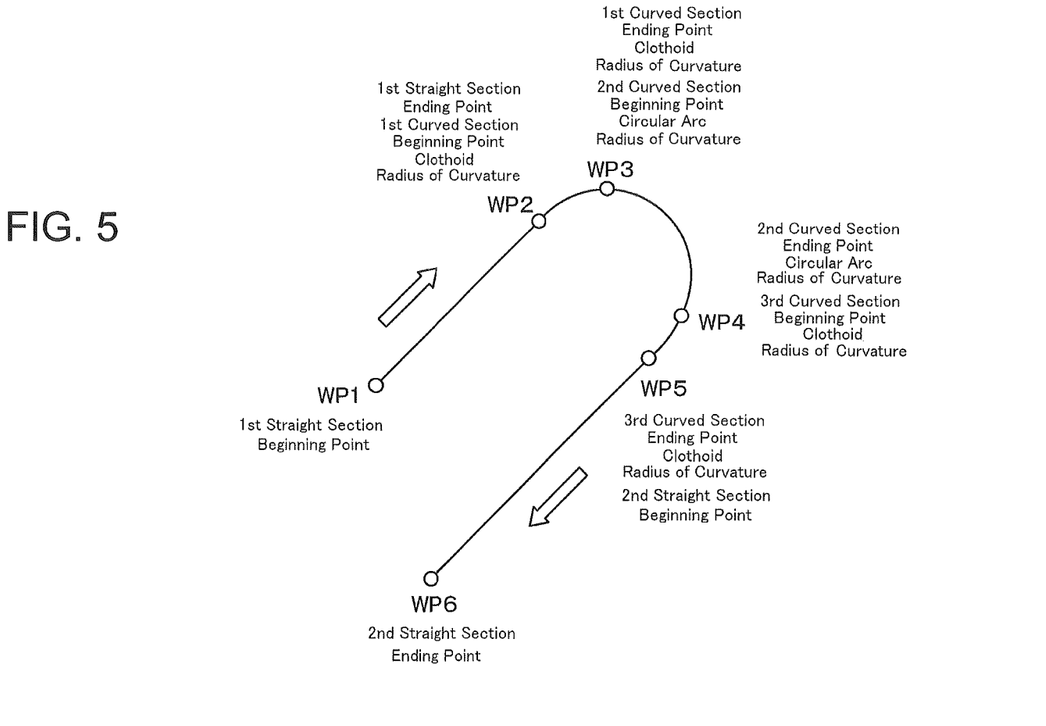
FIG. 5 shows an example of a desired running path of a working vehicle.

The desired running path generator 16 generates a desired running path, along which the working vehicle is to be guided to run in the working area. The desired running path may be a straight or curved path. FIG. 5 shows an example of a generated desired running path, which includes straight sections and curved sections. A desired running path may include a plurality of sections which may be continuous or discontinuous. A straight section may be defined by the positions of a plurality of way points WP including at least a beginning point and an ending point. A curved section may be defined by the positions of a plurality of way points WP including at least a beginning point and an ending point, the shape of curve (circular arc, clothoid, or others), the radius of curvature, and/or others.

The user interface 18 receives from the operator of the vehicle various inputs including certain vehicle related information known to the operator, as well as provides the operator with a visual or auditory alarm when a certain dangerous situation has occurred. Any vehicle related information received from the operator is supplied to, used by, and stored in the main data processing section 12. In particular, some of such information may be used by the vehicle related parameter estimator 122 as the initial values of some of the vehicle related parameters or as the data from which the initial values are determined.

The steering control mechanism 20 includes: an electric motor; a motor driver which drives the electric motor in response to the desired steering amount value generated by the desired steering amount generator 126; and a motion transmission for transmitting the rotation of the shaft of the electric motor to the steering wheel 200 or to a steering rod, so as to rotate the steering wheel 200 by the rotation angle corresponding to the desired steering amount value.

Figure 3:
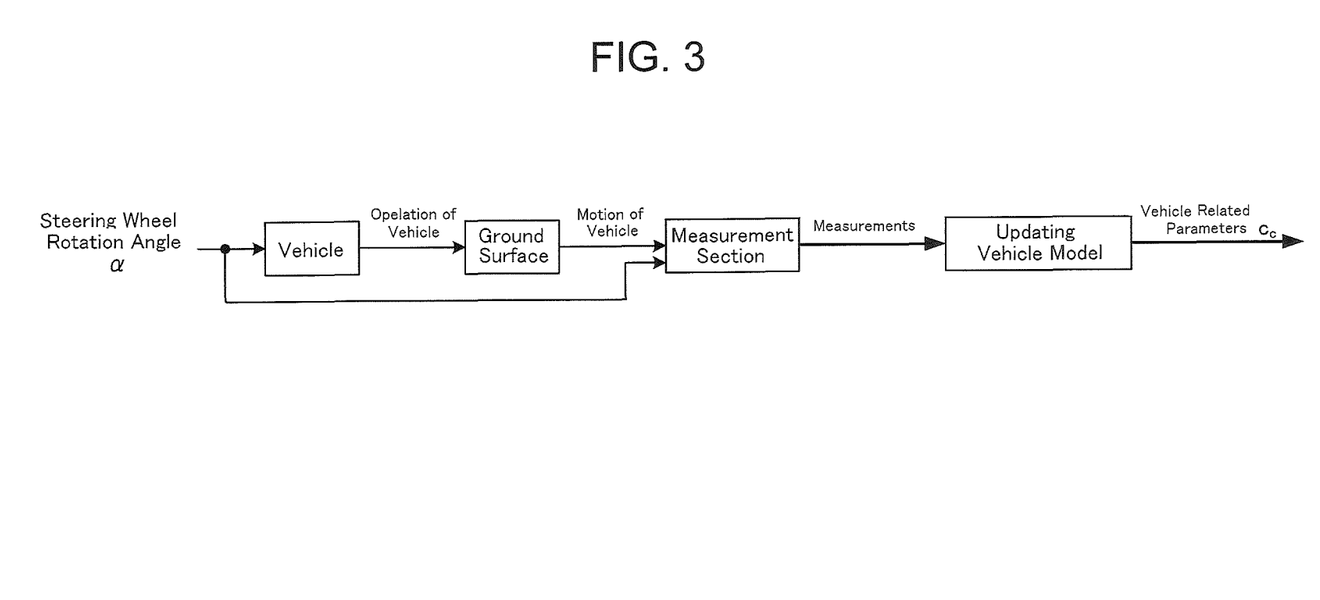
FIG. 3 is a block diagram illustrating a pre-adjustment mode of the automatic steering system of FIG. 1.

The automatic steering system 10 is adapted for operation in a first operation mode called "pre-adjustment mode" as well as in a second operation mode called "working mode." The pre-adjustment mode is to be adopted in advance to an operation of the automatic steering system 10 in the working mode. During operation of the system in the pre-adjustment mode, as shown in the block diagram of FIG. 3, the vehicle is driven or operated (by either manual or automatic steering) to run on a ground surface (which may be one found in the working area or one found in any other area but should be as flat or horizontal as possible), while values of various factors relating to the motion of the vehicle are measured and acquired by the measurement section 14. The measurements acquired by the measurement section 14 are then applied to a vehicle model so as to update the vehicle model and to determine the values of the vehicle related parameters Cc. For this purpose, at least right and left steering operations are conducted to cause the vehicle to turn right and left. The values of the vehicle related parameters Cc may be determined with improved precision by conducting the right and left steering operations up to the steering limits.

Figure 4:
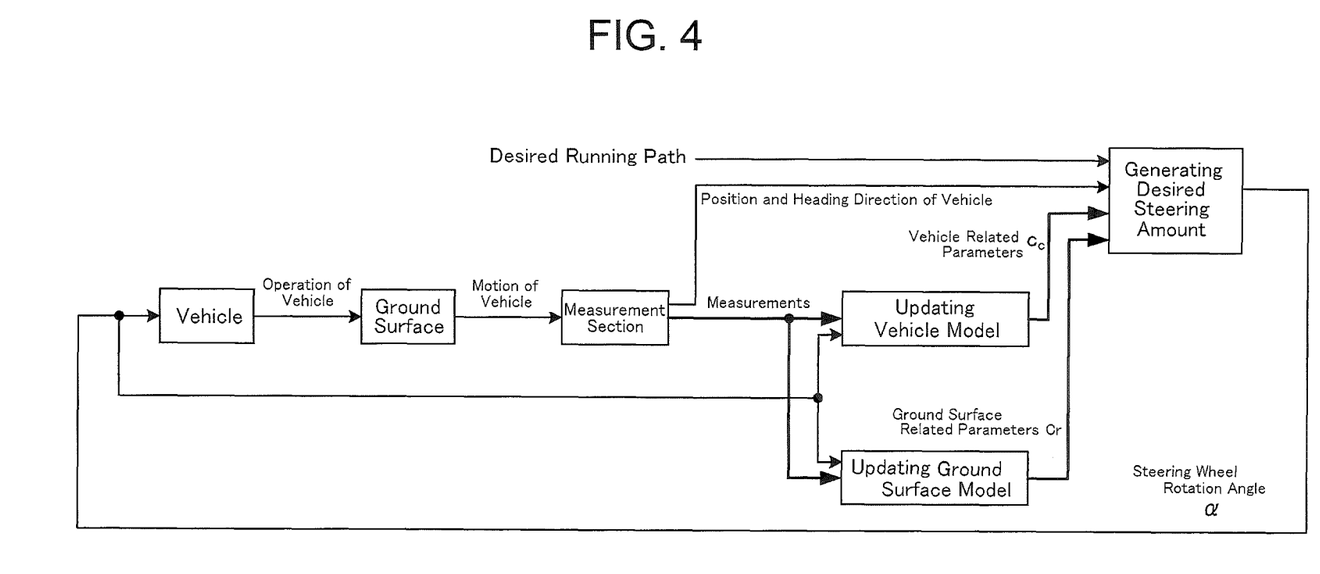
FIG. 4 is a block diagram illustrating a working mode of the automatic steering system.

During operation of the system in the working mode, as shown in FIG. 4, the vehicle is driven or operated (by automatic steering) to run on an actual working ground surface in the working area, while values of various factors relating to the motion of the vehicle are measured and acquired by the measurement section 14. Then, some of the measurements acquired by the measurement section 14 are applied to the vehicle model so as to update the vehicle model and to determine the values of the vehicle related parameters Cc, and the other to a ground surface model so as to update the ground surface model and to determine the values of the ground surface related parameters Cr.

In the following, the automatic steering system 10 is described more specifically. In connection with the main data processing section 12, the following symbols are used for identification purpose.

n: suffix identifying a particular one of time-discrete sample values or time-discrete generated values that is the (n)th of the values in time sequence α: parameter indicating the steering wheel rotation angle from its neutral position R: value of the vehicle turning radius a: combination of the roll and pitch angle values of the vehicle body as measured and acquired by the attitude/heading direction φ: suffix used for parameters relating to the roll angle of the vehicle body θ: suffix used for parameters relating to the pitch angle of the vehicle body measurement device 142

εx: scaling factors dominating updating rate and precision of values of parameters ax, ay, az: values of linear vibrations of the vehicle body along x-, y- and z-axes, as measured by the position/heading direction measurement device 142

ωx, ωy, ωz: values of angular vibrations of the vehicle body about the x-, y- and z-axes, as measured by the position/heading direction measurement device 142 k: suffix identifying a particular one of discrete frequencies

Ax, Ay, Az: suffixes used for values obtained by converting the linear vibrations of the vehicle body measured by the position/heading direction measurement device 142 into frequency expression, by means of discrete short-time Fourier transformation (discrete STFT) carried out by the linear vibration estimator 128.

Ωx, Ωy, Ωz: suffixes used for values obtained by converting the angular vibrations of the vehicle body measured by the position/heading direction measurement device 142 into frequency expression, by means of discrete short-time Fourier transformation (discrete STFT) carried out by the angular vibration estimator 130.

$A_x[k]$, $A_y[k]$, $A_z[k]$: suffixes used for values of frequency components of the linear vibrations of the vehicle body $\Omega_x[k]$, $\Omega_y[k]$, $\Omega_z[k]$: suffixes used for values of frequency components of the angular vibrations of the vehicle body V[k]: suffix used for a value composed of a combination of the values of frequency components of the vehicle body (1) Vehicle Related Parameters The vehicle related parameter estimator 122 determines the values of the "vehicle related parameters." The values of the vehicle related parameters indicate certain conditions of a particular working vehicle. Such conditions do not tend to be subject to any substantial variation while the vehicle is working and running in a given working area. Thus, the vehicle related parameters characterize the particular working vehicle while reflecting any aging degradation and individual variation which the particular working vehicle may have.

More specifically, during operation of the system in the pre-adjustment mode, which is to be conducted in advance of the commencement of work, various values are measured and acquired by the measurement section 14, and on the basis of measurements acquired by the measurement section 14, initial values of the vehicle related parameters are determined and applied to a vehicle model so as to update the vehicle model. Further, during operation of the system in the working mode, the values of the vehicle related parameters are updated. Since the values of the vehicle related parameters are determined during operation of the system in the pre-adjustment mode as conducted in advance of the commencement of work, any incremental variations in the values of the vehicle related parameters occurring at the update (which occur while the vehicle is running) can be reduced, and thereby the stability of the system characteristics can be improved.

The vehicle related parameters include: parameters indicating the relationship between the steering wheel rotation angle (steering amount) and the turning radius of the vehicle; a parameter indicating the inclination components of the vehicle body that are attributable to vehicle related factors; and a parameter indicating the vibrations components of the vehicle body that are attributable to vehicle related factors.

(1.1) Parameters Indicating the Relationship Between the Steering Wheel Rotation Angle (Steering Amount) and the Turning Radius of the Vehicle The relationship between the steering wheel rotation angle and the turning radius of the vehicle when the vehicle is placed in normal condition is indicated by four parameters described below.

(1.1.1) The ratio of the steering wheel rotation angle to the steered angle of the steerable wheels is indicated by "angle ratio parameter" g, the value of which is composed of a combination of an angle ratio value $g_r$ for right turn and an angle ratio value $f_l$ for left turn. The parameter g is dimensionless.

(1.1.2) The wheelbase of the vehicle (the distance between its front and rear wheel axles) is indicated by "wheelbase parameter" l. The initial value of parameter l may be inputted by the operator of the vehicle through the user interface 18 or may be preset in the system as a default value. The value of parameter l may be defined in meters (m).

The value of parameter g (i.e., the combination of the angle ratio values $g_r$ and $g_l$) and the value of parameter l can be simultaneously determined with the following process sequence.

First, during operation of the system in the pre-adjustment mode, the value of the steering ratio parameter g is determined on the basis of (i) the measured steering wheel-rotation angle α from the neutral position of the steering wheel, (ii) the inputted initial value of the wheelbase l, and (iii) the vehicle turning radius R, which is determined from the locus of the measured position of the running vehicle as measured by the position/velocity measurement device 141, according to the following equation:

$$g=\alpha/(\sin^{-1}(l/R))$$

Since the value of parameter g is the combination of the two angle ratio values $g_r$ and $g_l$, the above equation means that the two angle ratio values are determined.

During operation of the system in the working mode, the value of parameter g and the value of parameter l are periodically updated on the basis of newly measured steering wheel rotation angle and newly determined vehicle turning radii, by solving the following simultaneous equations:

$$R_1=l_x/(\sin(\alpha_1/g_x))$$

$$R_2=l_x/(\sin(\alpha_2/g_x))$$

where: $g_x$ and $l_x$ stand for the unknown, new values of parameters g and l, which are to be used for the update;

$\alpha_1$ and $\alpha_2$ stand for two different, newly measured steering wheel rotation angles; and $R_1$ and $R_2$ stand for newly determined vehicle turning radii corresponding to the steering wheel rotation angles $\alpha_1$ and $\alpha_2$, respectively.

By solving the above simultaneous equations, the update value $g_x$ of the angle ratio parameter g and the update value $l_x$ of the wheelbase parameter l are given. The update process is, however, not a direct replacement of the old values with the new values, but is carried out as a moderate replacement process using a scaling factor $\epsilon_g$, as shown by the following equations:

$$g[n]=g[n-1]+\epsilon_g(g_x-g[n-1])$$

$$l[n]=l[n-1]+\epsilon_l(l_x-l[n-1])$$

where: g[n] and l[n] stand for the new, updated values of parameters g and l, which are to be set at the (n)th update point in the periodic update process;

g[n−1] and l[n−1] stand for the old values of parameters g and l, which have been set at the (n−1)th update point in the periodic update process; and $\epsilon_g$ and $\epsilon_l$ stand for scaling factors for moderating incremental variations in the values of parameters g and l, which occur at the update.

(1.1.3) Limits of rotation of the steering wheel (steering limits) are indicated by "steering wheel rotation limit parameter," the value of which is composed of a combination of a rotation limit angle value $\alpha_{Rr}$ for right turn and a rotation limit angle value $\alpha_{Rl}$ for left turn. The values may be defined in radians (rad). During operation of the system in the pre-adjustment mode, the operator of the vehicle turns the steering wheel 200 to the right and left up to the steering limits, when the rotation angles of the steering wheel 200 are measured by the steering wheel rotation angle sensor 144, and the measurements are used as the initial values of the rotation limit angle values $\alpha_{Rr}$ and $\alpha_{Rl}$.

During operation of the system in the working mode, if a newly measured rotation angle value of the steering wheel 200 either of the rotation limit angle values $\alpha_{Rr}$ and $\alpha_{Rl}$, the exceeded rotation limit angle value is updated.

From the rotation limit angle values $\alpha_{Rr}$ and $\alpha_{Rl}$, the midpoint between them is determined, which is referred to hereinafter as the "assumed neutral position" of the steering wheel.

(1.1.4) Any deviation of the assumed neutral position of the steering wheel from the true neutral position of the steering wheel is indicated by "steering wheel asymmetry parameter" β, the value of which may be defined in radians (rad). The initial value of this parameter is set to be zero ("0").

The true neutral position of the steering wheel is the position that allows the vehicle to run straight on a flat (or smooth and horizontal) ground surface. Because the functionality of the steering wheel is designed to be in symmetry for right and left turns, it is expected that the assumed and true neutral positions are coincident one another. In actual, however, there is often some deviation of the assumed neutral position from the true neutral position, due to aging degradation and/or individual variation of the vehicle.

During operation of the system in the working mode, if (i) the change in the position of the vehicle as determined by the position/velocity estimator 141 suggests that the vehicle is running straight while (ii) the steering wheel rotation angle as detected by the steering wheel rotation angle sensor 144 suggests that the current position of the steering wheel is deviated from the assumed neutral position, then the value of the steering wheel asymmetry parameter β is updated in order to compensate and eliminate the deviation.

It is possible, however, that the ground surface on which the straight-running vehicle is running has lateral gradient and the steering wheel is rotated by the operator in order to compensate additional sideslip angle induced by the lateral gradient of the ground surface. Any such rotation of the steering wheel, i.e., "compensatory steering wheel rotation angle" ac, has to be taken into consideration when the value of parameter β is updated.

Thus, if I sample values of the steering wheel rotation angle have been acquired during a straight-run of the vehicle, the new value for the steering wheel asymmetry parameter β is determined according to the following equation:

$$\beta = (\Sigma^i \alpha[i])/I - \alpha_C$$

where: α[i] stands for the (i)th of the consecutive I sample values of the steering wheel rotation angle.

(1.2) Parameter Indicating the Inclination Components of the Vehicle Body that are Attributable to Vehicle Related Factors The vehicle body may be subject to inclination when the vehicle is running. Among the inclination components of the vehicle body, those which are attributable to certain vehicle related factors, such as differences in tire pressure between the tires of the vehicle or inaccuracy in mounting positions of the tires, are indicated by "vehicle-attributable vehicle body inclination parameter" $b_a$, the value of which is composed of a combination of a vehicle-attributable roll angle value $b_\phi$ and a vehicle-attributable pitch angle value $b_\theta$. These angle values may be defined in radians (rad).

During operation of the system in the pre-adjustment mode, the attitude/heading measurement device 142 successively measures or samples the roll angle values and the pitch angle values of the vehicle body while the vehicle is running along a measurement section of the running path. Calculation of averages of the sample values gives the vehicle-attributable roll angle value $b_\phi$ and the vehicle-attributable pitch angle value $b_\theta$. Since the value of parameter $b_a$ is composed of the combination of these values $b_\phi$ and $b_\theta$, this calculation may be shown by the following equation:

$$b_a = (\Sigma^i a[i])/I$$

where: I stands for the total number of the sample values (each sample value is composed of a combination of a roll angle value and a pitch angle value) as measured or sampled during operation of the system in the pre-adjustment mode; and a[i] stands for the (i)th of the consecutive I sample values.

The value of parameter $b_a$ (i.e., the combination of the vehicle-attributable roll and pitch angle values $b_\phi$ and $b_\theta$) thus determined may be used by the alarm generator 136. Specifically, the alarm generator 136 may compare the newly determined vehicle-attributable roll and pitch angle values $b_\phi$ and $b_\theta$ with corresponding, respective thresholds, and may output an alarm signal when one of the newly determined values $b_\phi$ and $b_\theta$ exceeds the corresponding threshold. Then, the user interface 18 may respond to the alarm signal by outputting a visual or auditory alarm so as to notify the operator of the vehicle that a problem may have occurred on a certain part of the vehicle, such as tires themselves or tire mounting.

During operation of the system in the working mode, the value of parameter $b_a$ is periodically updated. The update process is, however, not a direct replacement of the old values with the new values, but is carried out as a moderate replacement process using a scaling factor $\epsilon_a$, as shown by the following equation:

$$b_a[n] = b_a[n-1] + \epsilon_a(a - b_a[n-1])$$

where: $b_a[n]$ stands for the value of parameter $b_a$ at the (n)th update point in its update sequence;

$b_a[n-1]$ stands for the value of parameter $b_a$ at the (n−1)th update point in its update sequence;

a stands for the newly measured or sampled value of parameter $b_a$; and $\epsilon_a$ stands for a scaling factor for moderating incremental variation in the value of parameter $b_a$ occurring at the update.

Figure 6:
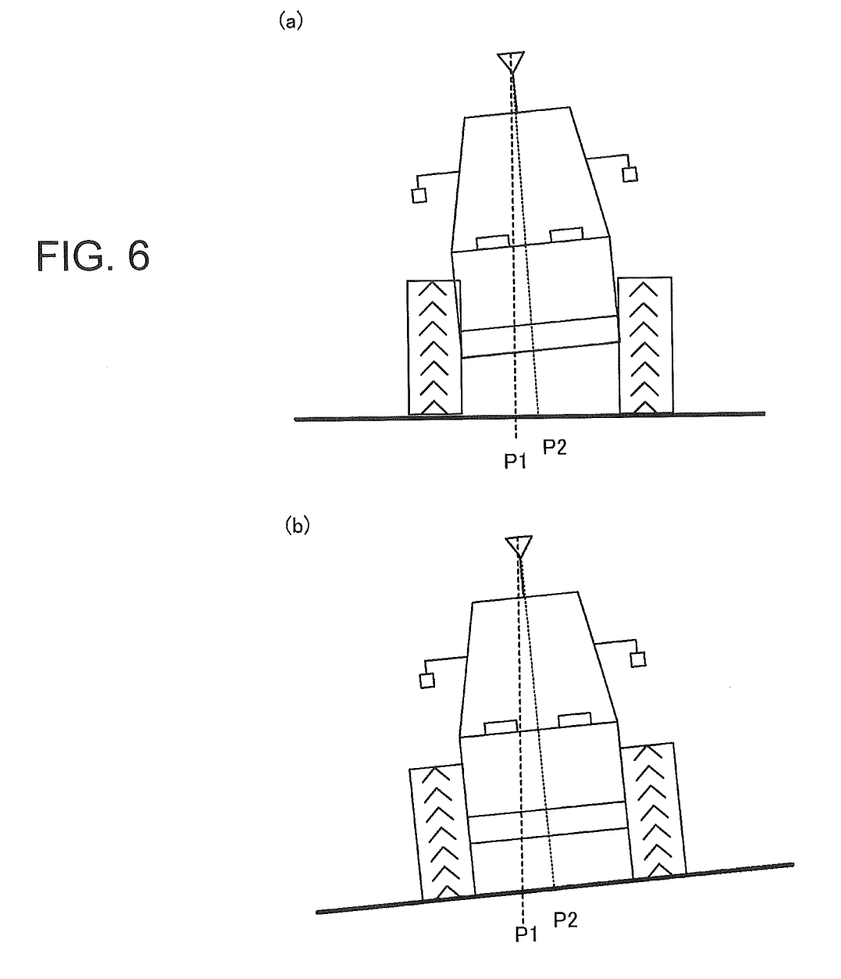

The value of parameter $b_a$ may be fedback to the measurement section 14 and used to compensate any errors in the plan position of the vehicle, which may be induced by the inclination of the vehicle body due to the height of the GPS antenna mounted on the vehicle body. Specifically, as shown in FIG. 6(a), the plan position of the vehicle as determined by the position/velocity measurement device 141 is actually the plan position of the GPS antenna. Thus, when the vehicle body is inclined, there is an error in the determined plan position of the vehicle, which corresponds to the distance between the plan position of the GPS antenna P1 (which lies at the foot of a vertical line drawn from the position of the GPS antenna) and the true plan position of the vehicle body P2 (which usually lies on the centerline of the vehicle body, such as at the midpoint between the front wheels or at the midpoint between the rear wheels). This error in the plan position, which is contained in the output of the position/velocity measurement device 141, can be compensated on the basis of the vehicle-attributable vehicle body inclination thus recognized.

(1.3) Parameter Indicating the Vibration Components of the Vehicle Body that are Attributable to Vehicle Related Factors The vehicle body may be subject to various linear and angular vibrations when the vehicle is running. Among the vibration components of such vibrations, those which are induced by certain vehicle related factors, such as engine vibrations or tire tread patterns, are indicated by "vehicle-attributable vibration parameter" $b_V[k]$, which is a combination of (i) vibration components of linear vibrations of the vehicle body along x-, y- and z-axes of the coordinate system fixed to the vehicle body and (ii) vibration components of angular vibrations of the vehicle body about the x-, y- and z-axes. The linear vibration components are shown by $b_{Ax}[k]$, $b_{Ay}[k]$ and $b_{Az}[k]$, respectively, the values of which may be defined by vibration acceleration in meters/second² (m/s²). The angular vibration components are shown by $b_{\Omega x}[k]$, $b_{\Omega y}[k]$ and $b_{\Omega z}[k]$, respectively, the values of which may be defined by angular velocity in radians/second (rad/s).

During operation of the system in the pre-adjustment mode, the linear and angular vibrations are measured or sampled. Calculation of averages of the sample values gives the value of parameter $b_V[k]$ (i.e., the values of the linear and angular vibration components $b_{Ax}[k]$, $b_{Ay}[k]$, $b_{Az}[k]$, $b_{\Omega x}[k]$, $b_{\Omega y}[k]$ and $b_{\Omega z}[k]$), as shown by the following equation:

$$b_V[k] = (\Sigma^i V[i][k])/I$$

where: I stands for the total number of sample values as measured or sampled during operation of the system in the pre-adjustment mode; and V[i][k] stands for the (i)th of the consecutive I sample values, each being the combination of the values of the linear and angular vibration components of the vehicle body.

The value of parameter $b_V[k]$ (i.e., the combination of the values of the vibration components $b_{Ax}[k]$, $b_{Ay}[k]$, $b_{Az}[k]$, $b_{\Omega x}[k]$, $b_{\Omega y}[k]$ and $b_{\Omega z}[k]$) thus determined may be used by the alarm generator 136. Specifically, the alarm generator 136 may compare the newly determined vibration components values with corresponding, respective thresholds, and may output an alarm signal when one of the newly determined vibration component values exceeds the corresponding threshold. Then, the user interface 18 may respond to the alarm signal by outputting a visual or auditory alarm so as to notify the operator of the vehicle that a problem may have occurred on a certain part of the vehicle, such as tires themselves or tire mounting.

During operation of the system in the working mode, the value of parameter $b_V[k]$ is periodically updated. The update process is, however, not a direct replacement of the old values with the new values, but is carried out as a moderate replacement process using a scaling factor $\epsilon_a$, as shown by the following equation:

$$b_V[n][k] = b_V[n][k] + \epsilon_{bV}(V[k] - b_V[n][k])$$

where: $b_V[n][k]$ stands for the value of parameter $b_V[k]$ at the (n)th update point in its update sequence;

$\epsilon_{bV}$ stands for a scaling factor for moderating incremental variation in the value of parameter $b_V[k]$ occurring at the update.

(2) Ground Surface Related Parameters

The ground surface related parameter estimator 124 determines the values of the "ground surface related parameters." The values of the ground surface related parameters indicate certain conditions of the ground surface on which the working vehicle is running. Such conditions tend to be subject to continuous variation while the vehicle is working and running in a given working area. Specifically, during operation of the system in the working mode, the values of the ground surface related parameters are determined on the basis of (i) the measurements acquired by the measurement section 14 and (ii) a ground surface model, so that the system can be quickly adapted to the conditions of the ground surface on which the vehicle is running.

More specifically, the ground surface related parameters include: a parameter indicating the inclination components of the vehicle body that are attributable to the ground surface gradient; a parameter indicating variation in the inclination components of the vehicle body that are attributable to the ground surface gradient; a parameter indicating the inclination components of the vehicle body that are attributable to the road surface gradient, a parameter indicating the variation in the inclination components of the vehicle body that are attributable to the road surface gradient; a parameter named "measured slipperiness parameter;" a parameter indicating the vibration components of the vehicle body that are attributable to ground surface related factors; a parameter named "estimated slipperiness parameter;" a parameter named "estimated unstableness parameter;" and a parameter named "slant sideslip amount parameter."

(2.1) Parameter Indicating the Inclination Components of the Vehicle Body that are Attributable to the Ground Surface Gradient The vehicle body may be subject to inclination when the vehicle is running. Among the inclination components of the vehicle body, those which are attributable to the gradient of the ground surface on which the vehicle is running, are indicated by "ground-surface-attributable vehicle body inclination parameter" $h_a$, the value of which is composed of a combination of a ground-surface-attributable roll angle value $h_\phi$ and a ground-surface-attributable pitch angle value $h_\theta$. These angle values may be defined in radians (rad). The value of parameter $h_a$ is determined by subtracting the value of parameter $b_a$ (which is the combination of the vehicle-attributable angle values $b_\phi$ and $b_\theta$) described above in item (1.2) from the roll and pitch angle values of the vehicle body as measured and acquired by the attitude/heading direction measurement section 142, as shown by the following equation:

$$h_a = a - b_a$$

where: a stands for the combination of the roll and pitch angles of the vehicle body as measured and acquired by the attitude/heading measurement device 142.

Like the value of vehicle-attributable vehicle body inclination parameter $b_a$, the value of parameter $h_a$ may be fedback to the measurement section 14 and used to compensate any errors in the plan position of the vehicle, which may be induced by the gradient of the ground surface due to the height of the GPS antenna mounted on the vehicle body. Specifically, as shown in FIG. 6(b), the plan position of the vehicle as determined by the position/velocity measurement device 141 is actually the plan position of the GPS antenna. Thus, when the vehicle body is inclined, there is an error in the determined plan position of the vehicle, which corresponds to the distance between the plan position of the GPS antenna P1 (which lies at the foot of a vertical line drawn from the position of the GPS antenna) and the true plan position of the vehicle body P2 (which usually lies on the centerline of the vehicle body, such as at the midpoint between the front wheels or at the midpoint between the rear wheels). This error in the plan position, which is included in the output of the position/velocity measurement device 141, can be compensated on the basis of the ground-surface-attributable vehicle body inclination thus obtained.

(2.2) Parameter Indicating the Variation in the Inclination Components of the Vehicle Body that are Attributable to the Ground Surface Gradient Variations in the roll and pitch angle values $h_\phi$ and $h_\theta$ of the ground-surface-attributable vehicle body inclination parameter $h_a$ described above in item (2.1) (which are the inclination components of the vehicle body that are attributable to the ground surface gradient) may be induced by, for example, undulations of the ground surface, and are indicated by "inclination variation parameter" $\Delta h_a$, which is composed of a combination of a roll angle variation value $\Delta h_\phi$ and a pitch angle variation value $\Delta h_\theta$. These angle variation values may be defined in radians (rad). The value of parameter $\Delta h_a$ is determined by calculating the difference between the previous sample value and the latest sample value of parameter $h_a$, as shown by the following equation:

$$\Delta h_a[n] = h_a[n] - h_a[n-1]$$

where: $h_a[n]$ and $h_a[n-1]$ stand for the latest and previous sample values of parameter $h_a$.

The value of parameter $\Delta h_a$ (i.e., the combination of the roll angle variation value $\Delta h_\phi$ and the pitch angle variation value $\Delta h_\theta$) thus determined may be used by the alarm generator 136. Specifically, the alarm generator 136 may compare the newly determined angle variation values $\Delta h_\phi$ and $\Delta h_\theta$ with corresponding, respective thresholds, and may output an alarm signal to the user interface 18 when one of the newly determined angle variation values $\Delta h_\phi$ and $\Delta h_\theta$ exceeds the corresponding threshold. Then, the user interface 18 may respond to the alarm signal by outputting a visual or auditory alarm so as to notify the operator of the vehicle that there may exist a dangerous situation. In addition, the automatic steering operation shutdown launcher 138 may also respond to the alarm signal by shutting down the automatic steering operation.

(2.3) Measured Slipperiness Parameter

The ratio of a measured turning radius of the vehicle to an expected turning radius of the vehicle is indicated by "measured slipperiness parameter" $S_R$, the value of which is dimensionless. This parameter shows deviation of an actual turning radius from an expected turning radius. The value of this parameter is determined by dividing an actual turning radius (which is determined from the locus of the position of the running vehicle as measured by the position/velocity measurement device 141) by an expected turning radius R, as shown by the following equation:

$$S_R = R_m / R$$

where: $R_m$ stands for a measured turning radius of the vehicle; and

R stands for an expected turning radius that is expected to be achieved by the steering wheel rotation angle being under controlled. Accordingly, a desired turning radius can be achieved by correcting the expected turning angle with the value of the measured slipperiness parameter and by determining a steering wheel rotation angle that corresponds to the corrected turning radius.

(2.4) Parameter Indicating the Vibration Components of the Vehicle Body that are Attributable to Ground Surface Related Factors The vehicle body may be subject to various linear vibrations and angular vibrations when the vehicle is running. Among the vibration components of such vibrations, those which are induced by certain ground surface related factors, such as undulations and roughness of the ground surface, are indicated by "ground-surface-attributable vibration parameter" $g_V[k]$, which is a combination of (i) vibration components of linear vibrations of the vehicle body along x-, y- and z-axes of the coordinate system fixed to the vehicle body and (ii) vibration components of angular vibrations of the vehicle body about the x-, y- and z-axes. The linear vibration components are shown by $g_{Ax}[k]$, $g_{Ay}[k]$ and $g_{Az}[k]$, respectively, the values of which may be defined by vibration acceleration in meters/second$^2$ (m/s$^2$). The angular vibration parameters are shown by $g_{\Omega x}[k]$, $g_{\Omega y}[k]$ and $g_{\Omega z}[k]$, respectively, the values of which may be defined by angular velocity in radians/second (rad/s).

The value of parameter $g_V[k]$ (i.e., a combination of the vibration component values $g_{Ax}[k]$, $g_{Ay}[k]$, $g_{Az}[k]$, $g_{\Omega x}[k]$, $g_{\Omega y}[k]$ and $g_{\Omega z}[k]$) may be determine as follows.

The attitude/heading measurement device 142 provides output signals showing the vibration components of linear and angular vibrations of the vehicle body. These output signals are measured or sampled during a predetermined time period. From the measurements, a power spectrum of each linear vibration component is derived by the acceleration/vibration estimator 128 and a power spectrum of each angular vibration component is derived by the angular velocity/vibration estimator 130. The set of power spectrum thus derived is shown by parameter V[k], Then, by subtracting the value of the vehicle-attributable vibration parameter $b_V[k]$ (which is described in item (1.3) above) from the value of this parameter V[k], the value of the ground-surface-attributable vibration parameter $g_V[k]$ is derived, as shown by the following equation:

$$g_V[k] = V[k] - b_V[k]$$

The value of the ground-surface-attributable vibration parameter $g_V[k]$ is composed of a set of vibration power values in different vibration frequencies. The vibration power values are used to determine the values of "estimated slipperiness parameter" and "estimated unstableness parameter," as described below in items (2.5) and (2.6), respectively.

(2.5) Estimated Slipperiness Parameter

The slipperiness of the ground surface, which may be estimated from the vibration components of the vehicle body that are attributable to ground surface conditions, is indicated by "estimated slipperiness parameter" $S_V$, the value of which is dimensionless. The value of this parameter is relatively high when the vehicle is running on a gravelly ground surface.

The value of this parameter is determined by extracting and summing the power spectrum components of relatively high frequencies from all the vibration components of the vehicle body that are attributable to ground surface conditions, as shown by the following equation:

$$S_V = \zeta * \Sigma^k W_S[k] g_V[k]$$

where; $W_S[k]$ stands for a window function for extracting only the power spectrum components of relatively high frequencies;

$\Sigma^k$ means the summation of the extracted power spectrum components over the extraction frequency range; and $\zeta$ stands for a predetermined parameter for converting the amount of the high frequency components into slipperiness.

The value of parameter $S_V$ is used to determine the value of "slant sideslip amount parameter" described later in item (2.7).

(2.6) Estimated Unstableness Parameter

The unstableness of the ground surface, which may be estimated from the vibration components of the vehicle body that are attributable to ground surface conditions, is indicated by "estimated unstableness parameter" $D_V$, the value of which is dimensionless. The value of this parameter is relatively high when the vehicle is running on a undulating rough ground surface.

The value of this parameter is determined by extracting and summing the power spectrum components of relatively low frequencies from all the vibration components of the vehicle body that are attributable to ground surface conditions, as shown by the following equation:

$$D_V = \Sigma^k W_D[k] g_V[k]$$

where: $W_D[k]$ stands for a window function for extracting only the power spectrum components of relatively low frequencies; and $\Sigma^k$ means the summation of the extracted power spectrum components over the extraction frequency range.

The value of parameter $S_V$ may be used by the alarm generator 136. Specifically, the alarm generator 136 may compare the value of this parameter with a predetermined threshold, and may output an alarm signal to the user interface 18 when the value exceeds the threshold. Then, the user interface 18 may respond to the alarm signal by outputting a visual or auditory alarm so as to notify the operator of the vehicle that there may exist a dangerous situation. In addition, the automatic steering operation shutdown launcher 138 may also respond to the alarm signal by shutting down the automatic steering operation.

(2.7) Slant Sideslip Amount Parameter

The sideslip amount, which may be estimated from the lateral gradient of the ground surface and the ground surface slipperiness, is indicated by "slant sideslip parameter" C, the value of which may be defined in meters (m). The value of this parameter is determined multiplying the lateral gradient of the ground surface (which is indicated by the groundsurface-attributable roll angle value $h_\phi$) and the value of the ground surface slipperiness $S_V$ together, as shown by the following equation:

$$C = S_V h_\phi$$

The value of the slant sideslip amount parameter C is used to generate a desired steering wheel rotation angle value, as described in the following.

(3) Process Sequence for Determining Desired Steering Wheel Rotation Angle (Desired Steering Amount)

The goals of the automatic steering operation of the vehicle are:

i) To drive the vehicle along a desired running path; and
ii) To head the vehicle to a desired heading direction.

In order to achieve these goals, the desired steering amount generator 126 generates a desired steering wheel rotation angle (i.e., a desired steering amount), according to the following process sequence.

(3.1) Determining Desired Running Path

The desired running path generator 16 generates a desired running path, which is supplied to the desired steering amount generator 126. The measurement section 14 determines the current vehicle position, which is also supplied to the desired steering amount generator 126. From the supplied information, the desired steering amount generator 126 identifies a particular one of the sections of the desired running path within which the vehicle is currently running, which is referred to as the "current section."

(3.2) Determining Desired Heading Direction of the Vehicle

The desired steering amount generator 126 then determines any position deviation w of the current vehicle position determined by the measurement section 14 from the identified current section.

Where the current section of the desired running path is a straight section, the position deviation w may be determined as the distance between the current vehicle position and the desired running path, which may be indicated by the length of a line drawn from the current vehicle position to the desired running path and extending perpendicular to the desired running path. Alternatively, if we draw a line passing the ending point of the straight section and extending perpendicular to the straight section, determine the distance between the current vehicle position and that line, determine a point on the straight section that lies to the side of the current vehicle position from the ending point of the straight line by that distance, and finally determine the distance between the current vehicle position and that point, then the position deviation w may be given as the finally determined distance.

Where the current section of the desired running path is a curved section, if we integrate the velocity of the vehicle from the time when it passed the beginning end of the section till the current time to derive the covered distance of the vehicle, and determine a point on the curved section that is distant from the beginning point of the curved section by that covered distance (the position of such point is referred to as the "desired vehicle position"), then the position deviation w may be given as the distance between the current vehicle position and the desired vehicle position.

The desired heading direction $\theta_w$ is determined by multiplying the position deviation w (shown in meters (m)) by a predetermined scaling factor $a_w$ and adding the resultant product to a desired azimuthal direction $\theta_r$ defined by of the desired running path, as shown by the following equation:

$$\theta_w = \theta_r + a_w w$$

The scaling factor $a_w$ is a constant for dominating the convergence speed of the vehicle position into the desired running path, the value of which is selected in view of safety and other factors. If the value of the product $(a_w * w)$ would exceed the value of ninety (90) degrees by the multiplication, then it should be set to be ninety degrees.

Where the current section is a straight section, the desired heading direction $\theta_w$ is coincident with the azimuthal direction of the straight section. Where the current section is a curved section, the desired heading direction $\theta_w$ may be the tangential direction of the curved section at the desired vehicle position described above.

(3.3) Determining Desired Turning Radius of the Vehicle

Then, the desired steering amount generator 126 determines a desired turning radius R of the vehicle on the basis of (i) the desired heading direction $\theta_w$ and (ii) any heading direction deviation $\theta_d$, which is the deviation of the current heading direction of the vehicle (which is measured by the position/velocity measurement device 141) from the desired heading direction $\theta_w$.

The desired turning radius R of the vehicle is inversely proportional to the heading direction deviation $\theta_d$, as shown by the following equation:

$$R = a_d / \theta_d$$

The scaling factor $a_d$ is a constant for dominating the convergence speed of the heading direction of the vehicle into the desired heading direction $\theta_w$, the value of which is selected in view of safety and other factors. The desired turning radius R has such limitation imposed by the characteristics of the vehicle that does not allow it to be smaller than a certain minimum value.

(3.4) Determining Desired Steering Wheel Rotation Angle $\alpha$

Where the vehicle is to turn right, the desired steering wheel rotation angle $\alpha$ for achieving the desired turning radius R of the vehicle is determined according to the following equation:

$$\alpha = g_R \sin^{-1}(S_R/R) - \beta + \alpha_C$$

If, however, the desired steering wheel rotation angle $\alpha$ given by the above equation would exceed the steering limit value $\alpha_{Rr}$, then the desired steering wheel rotation angle $\alpha$ is set to be equal to the steering limit value $\alpha_{Rr}$.

In the above equation, ac stands for the compensatory rotation angle of the steering wheel, which is required for compensating any position deviation due to the slant sideslip amount C. That is, where there is some slant sideslip amount C, the steering wheel rotation angle required for compensating the slant sideslip amount C is determined and subtracted. The required steering wheel rotation angle may be determined by a process sequence similar to that shown in items (3.2) and (3.3) above, and thus according to the following equation:

$$\alpha_C = g_R \sin^{-1}(S_R a_w C/a_d)$$

The desired steering wheel rotation angle $\alpha$ for achieving the desired turning radius R, where the vehicle is to turn left, can be determined through a similar process sequence.

The desired steering wheel rotation angle $\alpha$ thus determined is supplied to the steering control mechanism 20 so as to achieve the automatic steering operation. When a dangerous situation is detected by the alarm generator 136, the automatic steering operation shutdown launcher 138 activates a shutdown process of the automatic steering operation so as to avoid a possible danger. In the shutdown process, the electric motor of the steering control mechanism 20 may be inactivated and brought into zero torque mode. Alternatively or additionally, the automatic steering operation shutdown launcher 138 may output a signal for making the vehicle stop. The values of the thresholds which are used by the alarm generator 136 in order to detect a dangerous situation may be fixed or variable.

With the automatic steering system described above, the working vehicle can be advantageously guided to run along the desired running path by automatic steering, even where the conditions of the vehicle as well as the conditions of the ground surface on which the vehicle is running are subject to substantial variations.

LIST OF REFERENCE NUMERALS

10 Automatic steering system
12 Main data processing section
14 Measurement section
100 Working vehicle
122 Vehicle related parameter estimator
124 Ground surface related parameter estimator
126 Desired steering amount generator
136 Alarm generator

What is claimed is:

1. An automatic steering system for a working vehicle, for automatic maneuvering of the working vehicle running on a working ground surface along a desired running path, the automatic steering system comprising:
   a measurement section for acquiring measurements including those of position, velocity, heading direction, and attitude of the vehicle; and
   a data processing section;
   wherein the data processing section comprises:
      a vehicle related parameter estimator for determining a value of a vehicle related parameter;
      a ground surface related parameter estimator for determining a value of a ground surface related parameter; and
      a steering amount value generator for generating a desired steering amount value on the basis of the determined value of the vehicle related parameter and the determined value of the ground surface related parameter;
   wherein the automatic steering system is adapted for operation in a working mode which is to be adopted when the working vehicle runs on the working ground surface and in a pre-adjustment mode which is to be adopted in advance to an operation of the automatic steering system in the working mode;
   wherein, during an operation of the automatic steering system in the pre-adjustment mode, the vehicle related parameter estimator determines the value of the vehicle related parameter on the basis of the measurements acquired by the measurement section;
   wherein, during an operation of the automatic steering system in the working mode, the vehicle related parameter estimator updates the value of the vehicle related parameter and the ground surface related parameter estimator determines the value of the ground surface related parameter on the basis of the measurements acquired by the measurement section,
   wherein the measurement section further measures an acceleration and an angular velocity of the vehicle,
   wherein the vehicle related parameter includes at least a parameter indicating vibration components of a vehicle body,
   wherein the ground surface related parameter includes at least a parameter indicating ground surface slipperiness,
   wherein the parameter indicating the ground surface slipperiness includes a measured slipperiness parameter based on measurements by the measurement section and an estimated slipperiness parameter,
   wherein the ground surface related parameter estimator calculates the parameter indicating the vibration components of the vehicle body that are attributable to ground surface based on the acceleration and the angular velocity of the vehicle and the parameter indicating vibration components of the vehicle body, and
   wherein the ground surface related parameter estimator calculates the estimated slipperiness parameter by filtering the parameter indicating vibration components of the vehicle that are attributable to the ground surface.

2. An automatic steering system according to claim 1, wherein:
   the vehicle related parameter further comprises at least one of:
      a parameter indicating relationship between steering wheel rotation angle and turning radius of the vehicle, and
      a parameter indicating inclination of a vehicle body of the vehicle that is attributable to a vehicle related factor.

3. An automatic steering system according to claim 1, wherein:
   the ground surface related parameter further comprises a parameter indicating inclination of a vehicle body that is attributable to ground surface gradient.

4. An automatic steering system according to claim 1, wherein:
   the data processing section further comprises an alarm generator which compares a value of a ground surface related parameter with a threshold and outputs an alarm signal when the value of the ground surface related parameter exceeds the threshold.

5. An automatic steering system according to claim 1, wherein the determination of the values of the vehicle related parameter is conducted separately from the determination of the values of the ground surface related parameters.

6. An automatic steering system according to claim 1, wherein the vehicle related parameter comprises a characterization of a particular working vehicle and reflects an aging degradation of the working vehicle and an individual variation of the working vehicle from another working vehicle.

* * * * *